United States Patent
Ashrafi

(10) Patent No.: US 8,156,239 B1
(45) Date of Patent: Apr. 10, 2012

(54) ADAPTIVE MULTIMEDIA RENDERER

(75) Inventor: Solyman Ashrafi, Plano, TX (US)

(73) Assignee: Metropcs Wireless, Inc., Richardson, TX (US)

( * ) Notice: Subject to any disclaimer, the term of this patent is extended or adjusted under 35 U.S.C. 154(b) by 0 days.

(21) Appl. No.: 13/044,240

(22) Filed: Mar. 9, 2011

(51) Int. Cl.
  *G06F 15/16* (2006.01)
  *H04N 7/12* (2006.01)

(52) U.S. Cl. .................................. 709/231; 375/240.02

(58) Field of Classification Search .......... 709/231–233, 709/234–235; 375/240.02
See application file for complete search history.

(56) References Cited

U.S. PATENT DOCUMENTS

| | | | |
|---|---|---|---|
| 6,317,795 B1 | 11/2001 | Malkin et al. | |
| 6,701,316 B1 | 3/2004 | Li et al. | |
| 6,757,273 B1 | 6/2004 | Hsu et al. | |
| 7,054,903 B2 | 5/2006 | Kadyk et al. | |
| 7,065,573 B2* | 6/2006 | Byrnes | 709/224 |
| 7,636,768 B2 | 12/2009 | Yang et al. | |
| 7,783,267 B1 | 8/2010 | Harel et al. | |
| 7,817,624 B2* | 10/2010 | Dube et al. | 370/352 |
| 2002/0188745 A1* | 12/2002 | Hughes et al. | 709/231 |
| 2004/0179605 A1 | 9/2004 | Lane | |
| 2004/0225728 A1 | 11/2004 | Huggins et al. | |
| 2005/0076136 A1 | 4/2005 | Cho et al. | |
| 2006/0104203 A1* | 5/2006 | Krantz et al. | 370/230 |
| 2006/0168303 A1 | 7/2006 | Oyama et al. | |
| 2006/0198392 A1* | 9/2006 | Park et al. | 370/468 |
| 2007/0038778 A1 | 2/2007 | Miao et al. | |
| 2007/0180135 A1 | 8/2007 | Kenrick et al. | |
| 2008/0086570 A1* | 4/2008 | Dey et al. | 709/231 |
| 2008/0098446 A1* | 4/2008 | Seckin et al. | 725/114 |
| 2008/0133744 A1 | 6/2008 | Ahn et al. | |
| 2008/0162714 A1* | 7/2008 | Pettersson | 709/231 |
| 2008/0268770 A1 | 10/2008 | Ashbrook et al. | |
| 2010/0017439 A1 | 1/2010 | Chen et al. | |
| 2010/0049866 A1 | 2/2010 | Friedman | |
| 2010/0205318 A1 | 8/2010 | Melnyk et al. | |
| 2011/0022702 A1* | 1/2011 | Riley et al. | 709/224 |

FOREIGN PATENT DOCUMENTS

| | | |
|---|---|---|
| EP | 1744517 A1 | 1/2007 |
| EP | 1965564 A1 | 2/2008 |
| EP | 1940105 A1 | 7/2008 |
| WO | 9962268 A2 | 12/1999 |
| WO | 2008100474 A1 | 8/2008 |
| WO | 2009126676 A2 | 10/2009 |
| WO | 2010042090 A1 | 4/2010 |

OTHER PUBLICATIONS

Euler-Lagrange equation, Wikipedia, http://en.wikipedia.org/wiki/Euler%E2%80%93Lagrange_equation, pp. 1-10.*

(Continued)

*Primary Examiner* — Chirag R Patel
(74) *Attorney, Agent, or Firm* — Howison & Arnott, L.L.P.

(57) ABSTRACT

A server for adaptively rendering a multimedia content stream includes a first interface for connecting the server to a multimedia network server to receive an original multimedia content stream. A second interface connects the server to a client for receiving a rendered multimedia content stream. Processing logic determines rendering parameters responsive to connection parameters related to connection bandwidth between the server and the client. Rendering logic renders the multimedia content stream from the original multimedia content stream responsive to the rendering parameters.

15 Claims, 4 Drawing Sheets

OTHER PUBLICATIONS

Yun Zhang, Gang Yi Jiang, Mei Yu, and Yo Sung Ho (Adaptive Multiview Video Coding Scheme Based on Spatiotemporal Correlation Analyses, Apr. 2009, ETRI Journal, vol. 31, No. 2, pp. 151-161).*

Masayuki Hiromoto, "Dynamic Rate Control for Media Streaming in High-Speed Mobile Networks", 2009. ftp://lenst.det.unifi.it/pub/LenLar/proceedings/2009/wcnc09/DATA/T04S05P02.PDF.

Javier Aguiar, "Personal Multimedia Services over a Common Home and Access Networking Environment", Nov. 2009. http://dl.comsoc.org/livepubs/sample/ni/public/nov/pdf/aguiar2.pdf.

Yung-Hsiang Lu, David S. Ebert and Edward J. Delp, "Resource-driven content adaptation", Proc. SPIE 6065, 60650L (2006); doi:10.1117112.65973 http://www.purdue.edu/discoverypark/vaccine/publications/pdf/Resource-Driven%20Content%20Adaptation.pdf.

Paolo Bellavista, Antonio Corradi, and Cesare Stefanelli. 2003. Application-Level QoS Control for Video-on-Demand. IEEE Internet Computing 7, 6 (Nov. 2003), 16-24. DOI=10.1109/Mic.2003.1250579 http://dx.doi.org/10.1109/Mic.2003.1250579 http://dslab.csie.ncu.edu.tw/93html/paper/pdf/Application-Lever/020Qos%20Control%20for%20Video-on-Demand.pdf.

Lei, Z.; Georganas, N. D.; "Video transcoding gateway for wireless video access" Electrical and Computer Engineering, 2003. IEEE CCECE 2003. Canadian Conference on, May 4-7, 2003; pp. 1775-1778 vol. 3; ISSN: 0840-7789; Print ISBN: 0/7803-7781-8; INSPEC Accession Number: 7946696 DOI: 10.1109/CCECE.2003.1226254 http://www.discover.uottawa.ca/publications/files/CCECE2003_Ryan.pdf.

Baowei Ji, "Multimedia in Home Networking", University of Florida, Jul. 2004 http://www.list.ufl.edu/publications/CITSA-final-4-20.pdf.

Reinhard Baier, "Penguin: DAVIC and the WWW in Coexistence", part of the 4th international IDMS workshop, Sep. 1997 http://books.google.com/books?id=91aZbkOdtDYC&lpg=PP1&pg=PA80#v=onepage&q&f=false.

Vetro, A.; Timmerer, C.; "Digital item adaptation: overview of standardization and research activities" Multimedia, IEEE Transactions on, Jun. 2005; vol. 7 Issue:3; pp. 418-426; ISSN: 1520-9210; INSPEC Accession No. 8430264; DOI: 10.1109/TMM.2005.846795 http://www-itec.uni-klu.ac.at/publicati ons/mmc/TR_DigitalItem-AdaptationOverview0fStandardizationAndResearchActivities_Jun2005.pdf.

Dapeng Wu; Hou, Y.T.; "Ya-Qin Zhang; Scalable video transport over wireless IP networks" Personal, Indoor and Mobile Radio Communications, 2000 PIMRC 2000. The 11th IEEE International Symposium on, London, UK, 2000; pp. 1185-1191 vol. 2; Print ISBN 0-7803-6463-5; INSPEC Accession No. 6858827; DOI: 10.1109/PIMRC.2000.881607.

Maija Metso and Jaakko J. Sauvola, "Media wrapper in adaptation of multimedia content for mobile environments", Proc. SPIE 4209, 132 (2001); doi:10.1117/12.420813 http://dx.doi.org/10.1117/12.420813.

Robbie De Sutter, Sam Lerouge, Jeroen L. Bekaert, Boris Rogge, Dimitri Van De Ville and Rik Van de Walle, "Dynamic adaptation of multimedia data for mobile applications", Proc. SPIE 4862, 240 (2002); doi:10.1117/12.473039 http://dx.doi.org/10.1117/12.473039.

* cited by examiner

ADAPTIVE MULTIMEDIA RENDERER

TECHNICAL FIELD

The present invention relates to the transmission of multimedia content from a multimedia server to a client, and more particularly, to the use of an adaptive multimedia-rendering server located between the multimedia network server and a client to control transmission of the multimedia content to the client.

BACKGROUND

When providing multimedia content to a user, a client application is used within the computer, cell phone PDA, etc., of the user to communicate with a multimedia flash server in order to obtain the multimedia information that is desired. Existing multimedia distribution sites such as YouTube take stored multimedia content and convert the content into up to five different versions that are dependent upon the bandwidth available to a user and the particular device or terminal that is being utilized by the user to connect to the multimedia server. Since this connection mechanism is client-server based, the multimedia server does not adapt to available bandwidth requirements, and the client selects the version of the multimedia information that is to be transmitted from the multimedia server to the client.

In most applications, the client comprises a flash player plug-in that is located within the mobile browser or computer browser of the user. Existing LTE Radio Access Network protocols provide a variety of different manners for controlling the throughput of radio over an established connection. For example, in LTE there are approximately 28 modulation and coding levels, which each represent a specific throughput for a given physical bandwidth, which can be dynamically selected within the system responsive to different radio environments. Thus, some manner for utilizing the variety of different control mechanisms for altering and controlling the throughput of a multimedia wireless connection that is under control of a network side provider rather than being solely under the provision of a client application associated with a user, would greatly benefit network service providers in controlling the manner and quality of multimedia content provided to their users while saving capacity on the network.

SUMMARY

The present invention, as disclosed and described herein, in one aspect thereof, comprises a server for adaptively rendering a multimedia content stream based on the rate plan of the user as well as the capacity of the network. A first interface connects a proxy server to a multimedia network server to receive an original multimedia content stream. A second interface connects the server to a client for receiving a rendered multimedia content stream. Processing logic determines rendering parameters responsive to connection parameters related to a connection bandwidth between the server and the client as well as the constraints from the transport path. Rendering logic renders the multimedia content stream from the original multimedia content stream responsive to the rendering parameters.

BRIEF DESCRIPTION OF THE DRAWINGS

For a more complete understanding, reference is now made to the following description taken in conjunction with the accompanying Drawings in which.

DETAILED DESCRIPTION

Figure 1:
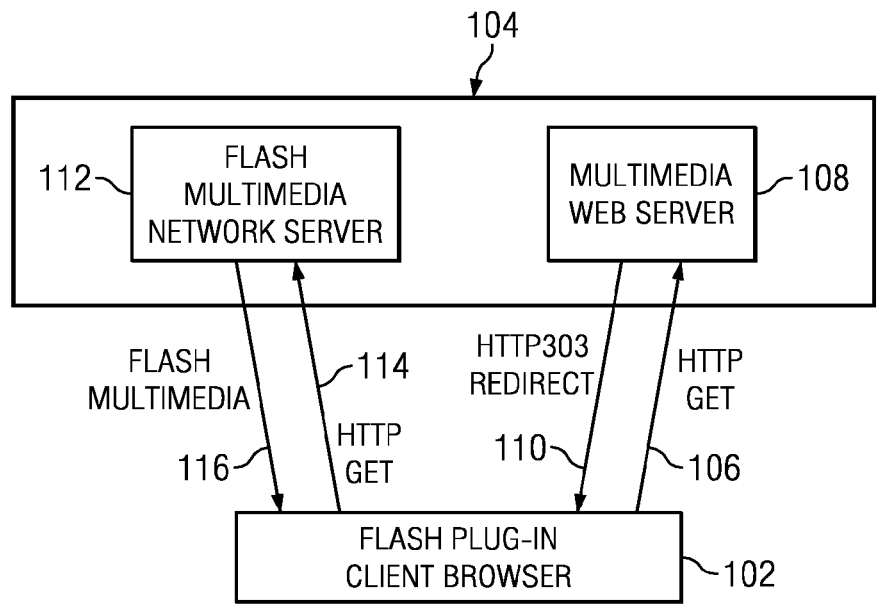
FIG. 1 illustrates the manner for making a multimedia content request from a client browser to a multimedia content provider via the internet.

Referring now to the drawings, wherein like reference numbers are used herein to designate like elements throughout, the various views and embodiments of an adaptive multimedia renderer are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the manner in which a flash plug-in client browser 102 may make a request for multimedia content through the internet 104. The flash plug-in browser 102, which is located within a browser of a mobile telephone, computer, laptop, etc., performs an HTTP get request 106 to a multimedia web server 108. While the following description is made with respect to a flash multimedia server and flash client, other types of multimedia servers and clients may be used in accordance with the present invention. The multimedia web server 108 would be associated with a website such as YouTube and would provide the ability for the user associated with the flash plug-in browser 102 to access various multimedia content over the internet 104.

Responsive to the HTTP get message 106, the multimedia web server 108 provides an HTTP 303 redirect message 110 from the multimedia web server 108 back to the flash plug-in client browser 102. The HTTP 303 redirect message 110 instructs the flash plug-in client browser 102 of the location of the flash multimedia network server 112 from which the multimedia content may be accessed. Responsive to the HTTP 303 redirect message 110, the flash plug-in client browser 102 generates a further HTTP get message 114 to the flash multimedia network server 112 requesting the download of the particular flash multimedia content. The flash multimedia network server 112 accesses the multimedia content and downloads the flash multimedia content 114 from the flash multimedia network server 112 back to the flash plug-in client browser 102.

Figure 2:
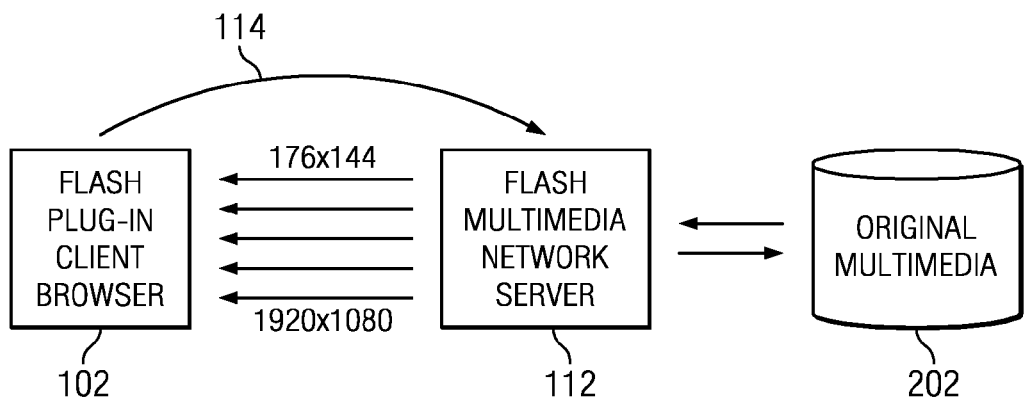
FIG. 2 illustrates the manner in which a client flash plug-in selects a download level from the plurality of available download levels from the flash multimedia network server.

Referring now to FIG. 2, there is illustrated the manner in which the original multimedia content that is stored within a database 202 is provided from the flash multimedia network server 112 to the flash plug-in client browser 102. The flash plug-in client browser 102 makes the initial HTTP get request 114 to the flash multimedia network server 112 as described previously with respect to FIG. 1. The flash multimedia server 112 accesses the original multimedia content from the database 202 such that the video or other type of multimedia content may be provided on the flash multimedia network server 112 to the plug-in client 102. The flash multimedia network server 112 provides the multimedia content in five different formats that are generated in differing bit rates. In this case, the data information can be provided in a bit rate format from anywhere from 176×144 to 1920×1080 pixels. The client flash plug-in 102 selects and controls the various formats that are desired based upon the needs of the client browser. The flash multimedia network server 112 does not perform any type of bandwidth detection, but instead, relies upon the client to switch between the differing qualities provided by the different bit rate depending upon the needs of the client 102.

Figure 3:
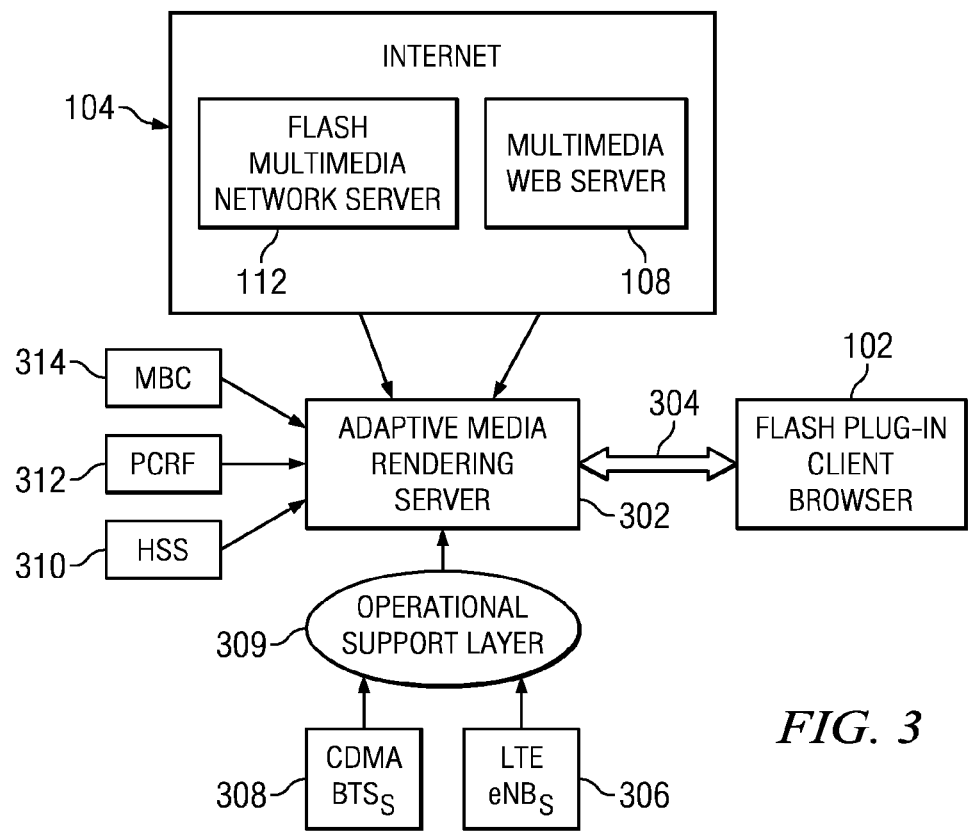
FIG. 3 illustrates the use of the adaptive media rendering server for controlling the download of multimedia content from a multimedia network server to a client plug-in within a user's browser.

Referring now to FIG. 3, rather than having the client 102 control the quality and coding content of the information transmitted to the flash plug-in browser, an adaptive media rendering proxy server 302 is inserted between the flash plug-in client browser 102 and the flash multimedia network server 112 and multimedia web server 108. The adaptive media-rendering server 302 receives the multimedia content from the flash multimedia network server 112. The multimedia rendering server 302 decides upon the formatting, coding and generation of the multimedia information that is being transmitted from the adaptive media-rendering server 302 to the flash plug-in client browser 102 over its connected data link 304 based upon received information in real time. The connected data link in one embodiment comprises a wireless connection through an eNB or BTS, but may also comprise a wired connection. The adaptive multimedia rendering server 302 bases its selections upon the particular quality of video to be transmitting over the wireless connection 304 based upon a variety of information received from different sources associated with the connection that is being provided to the wireless device associated with the flash plug-in client browser 102. The sources of information include LTE eNBs 306, CDMA base transceiver stations 308, HSSs 310, PCRFs 312 and MBC 314.

The enhanced node B (eNB) 306 comprise the hardware that is used for connecting a mobile phone with the network in an LTE network. eNBs use OFDM for Down Link and FDMA for Up Link as their interface technologies. Radio frequency transmitters and receivers enable the network to communicate with a mobile device. The eNBs 306 can provide information to the Operational Support Layer (OSS) 309 and in turn to the adaptive media rendering server 302 with information relating to the QAM-coding levels, transport conditions and PEVQ levels. PEVQ (perceptual evaluation of video quality) is a standardized end-to-end measurement algorithm to score the quality of a video presentation by means of a five point mean opinion score (MOS). The measurement algorithm can be applied to analyze visible artifacts caused by a digital video encoding/decoding (or transcoding) process, RF or IP base transmission networks and end user devices. Thus, using the PEVQ information as well as QAM-Coding and transport bandwidth information from the OSS system, the adaptive media-rendering server 302 can have a quality level with respect to the quality of the original video, the rate plan of the user and network capacity conditions via the adaptive media-rendering server 302 to the client 102 over the data link 304.

Base transceiver stations (BTSs) 308 provide wireless connection information with respect to a CDMA network and a wireless device to the OSS 309. The base transceiver station comprises hardware that facilitates the wireless communications between the mobile stations and a CDMA network. Similar to the enhanced node B hardware of the LTE networks, the CDMA BTSs 308 provide information to the adaptive rendering server 302 relating to the connection quality between the base transceiver stations 308 and associated wireless mobile devices. This information is utilized by the adaptive rendering server 302 in controlling the connection link 304 to a particular client 102.

The HSS (home subscriber server) 310 is a master user database that supports network components that are handling wireless calls. The HSS 310 contains subscription related information (subscriber profiles) that includes all information relating to users making or receiving calls and their subscription levels. The HSS additionally performs authentication and authorization of users for the network and can provide information relating to a subscriber's location and IP information. The home subscriber server 310 provides information to the adaptive media-rendering server 302 that relates to the subscriber associated with a particular client 102. This includes information such as rate plans to which the subscriber is associated and the level of subscriber that is associated with the particular client 102. For example, the HSS 310 can provide the adaptive multimedia-rendering server with information indicating that a subscriber is more valuable or pays at a higher rate plan, thus indicating that more bandwidth could be designated to the subscriber. Lower level subscribers or rate plans could be provided with satisfactory, yet lower quality connection links when bandwidth limitation issues become a problem.

The PCRF (policy, charging and rules function) 312 determines the policy rules associated with the multimedia network. The PCRF 312 plays a central role in next generation networks. The PCRF accesses subscriber databases and other specialized functions such as enforcement systems and provides this information to the adaptive media-rendering server 302. The PCRF 312 obtains and provides quality of service and traffic policy information to the adaptive multimedia-rendering server 302 to assist in rendering the multimedia information for transmission to the flash plug-in client browser 102. This quality of service and traffic policy information relates to the quality of service and traffic policies that are associated with a connection to the flash plug-in client browser 102 that will be provided over the communications link 304.

The MBC (Mobile Broadband Charging) 314 provides information with respect to the charging policies to the network provider that is providing a connection to the flash plug-in client browser 102. This charging policy information is utilized by the adaptive media-rendering server 302 to make determinations with respect to the quality of rendering that should be provided between the adaptive media rendering server 302 and the client 102. Charging policy information would include day passes, week passes, month passes and other charging rules. For example, for higher paying or charged customers, a larger portion of the bandwidth may be assigned for a connection 304 than would be for a low-level or charged customer.

A flash multimedia network server 112 provides a streaming multimedia data stream between the flash multimedia network server 112 and the adaptive media-rendering server 302. This streaming multimedia is the data stream that is further rendered by the adaptive multimedia rendering server 302 in accordance with the information obtained from all of the other information services when determining the level of quality to be assigned over a particular data link 304 between the adaptive medial rendering server 302 and a particular flash plug-in client browser 102. The multimedia web server 108 as discussed earlier enables control of the information that is being selected for downloading from the flash multimedia network server 112 to the adaptive media-rendering server 302.

The adaptive multimedia rendering server 302 renders a multimedia content stream from the flash multimedia network 112 to the flash plug-in client browser 102 for a given rate plan and quality of service while minimizing the load that is placed upon the network that is providing the data connection 304. Thus, in high load times, the particular rendering is performed to be slightly downgraded or upgraded for some clients depending upon their rate plan and desired or indicated quality of service level before the connection 304. The server 302 can control the rendered multimedia stream in accordance with the requirements and needs of the network provider.

Figure 4A:
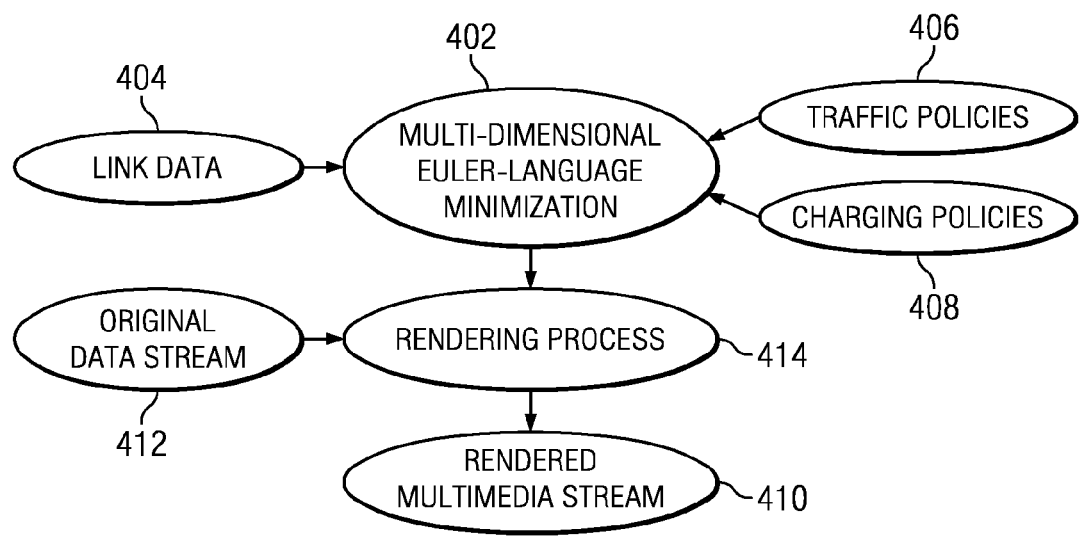
FIG. 4a illustrates the internal functions provided within the adaptive media-rendering server.

Referring now to FIG. 4a, there is provided some more detailed information of the internal operating functionalities of the adaptive multimedia-rendering server 302. Within the adaptive media-rendering server 302, a multi-dimensional Euler-Lagrange Minimization algorithm 402 is utilized to process all of the provided data link information 404, traffic policy 406 and charging policies 408 to determine the rendering parameters of the multimedia data stream 410. This allows the rendering of the multimedia content based upon the user's rate plan and the network capacity. While a multi-dimensional Euler-Lagrange Minimization algorithm is described with respect to the present embodiment, any multi-dimensional optimization technique may also be used. The utilized technique should look for a global minima of a multi-dimensional hyper surface that is embedded by different dimensions (i.e., quality of sessions, quality of media, capacity of the radio access, capacity of transport . . . etc.). Thus, the optimization algorithm may use various types of link data to control the quality of the connection. For example in the radio environment, fading, path loss and time dispersion data may be used to determine information such as packet loss, round trip delay, jitter and frame rate deviation. In the transport environment, fading, cable loss and transport information may also be used to determine packet loss, round trip delay, jitter and frame rate deviation. The connection may then be adjusted to improve these results.

Is another implementation, encoding may be controlled to adjust the encoded bit rate, the initial buffering and re-buffering to improve or degrade packet losses. In yet a further implementation, the quality of experience may be monitored and controlled according to the equation:

$$QoE = f(MQ + SQ)$$

where: MQ equals media quality (packet loss, round trip delay, jitter and frame rate deviation);
SQ equals session quality (encoded bit rate, initial buffering and re-buffering).

Figure 4B:
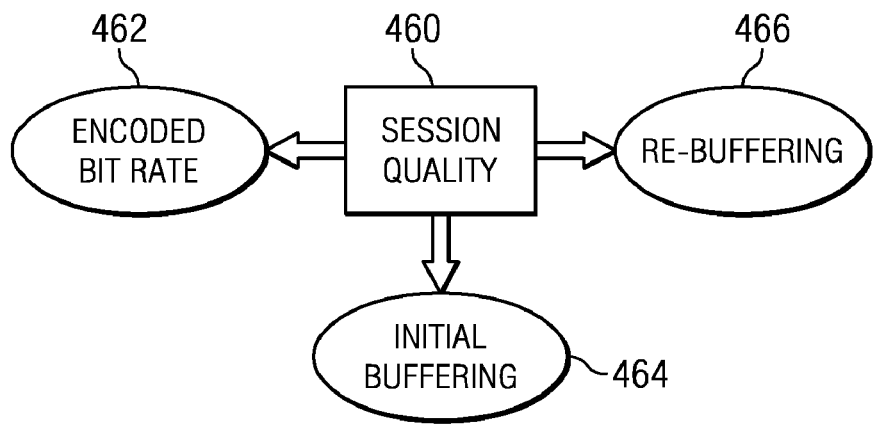
FIG. 4b illustrates various factors affecting session quality.
Figure 4C:
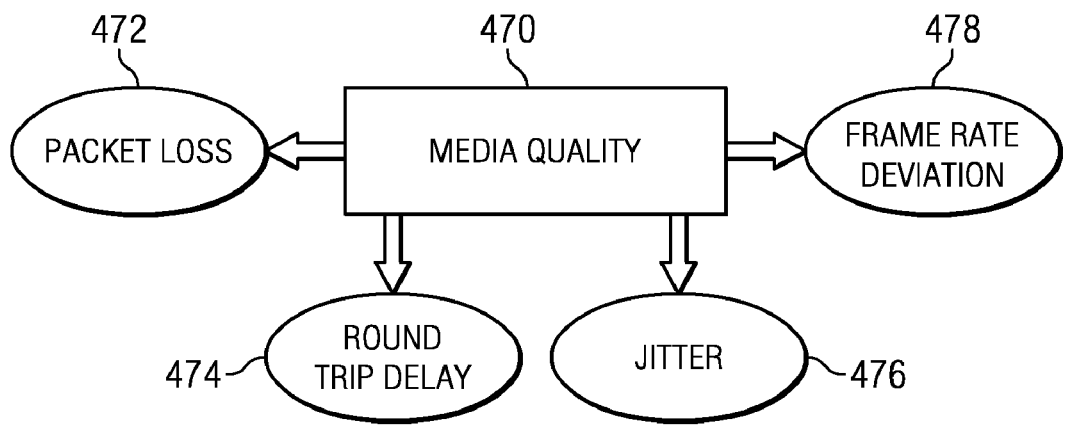
FIG. 4c illustrates various factors affecting media quality.

Referring now also to FIGS. 4b and 4c, there are more fully illustrated what is meant by session quality and media quality. The session quality 460 depends upon the encoded bit rate 462, the initial buffering 464 and the re-buffering 466. The media quality 470 depends upon the packet loss 472, the round trip delay 474, the jitter 476 and the frame rate deviation 478. The session quality 460 and the media quality 470 may then be able to determine the quality of experience. The most optimum point will maximize QoE (quality of experience). The capacity of the network is based on given radio and transport conditions as well as the user's rate plan and quality of service.

As described previously, the data link information 404 can come from OSS systems (CDMA and LTE). The traffic policy information 406 is provided from the PCRF 312 while charging policies 408 can come from the MBC 314 and HSS 310.

An original multimedia data stream 412 provided from the YouTube flash multimedia network server 112, for example, is provided to a rendering process 414 within the adaptive multimedia-rendering server 302 along with the output of the multi-dimensional Lagrange Minimization process 402. It should also be appreciated that other processing algorithms may be used to analyze the provided link information and select rendering levels. The rendering process 414 may then generate the rendered multimedia stream 410 responsive to the parameters that have been established in accordance with the output of the Euler-Lagrange Minimization process 402 or other process. As the rendering process 414 occurs in realtime, changing link data 404, traffic policies 406 and charging policies can alter the parameters in realtime that are being provided by the multi-dimensional Euler-Lagrange Minimization process 402 to the rendering process 414. This can cause changes to the rendering parameters to occur in real time. Thus, the rendering of the original data stream 412 to the rendered multimedia stream 410 can change on the fly to account for changing network connection priorities or bandwidth limitations that may occur. This allows the network provider to provide a realtime optimization control of their connection links to the clients 102 that are interacting with the provider network to receive various multimedia content streams.

Figure 5:
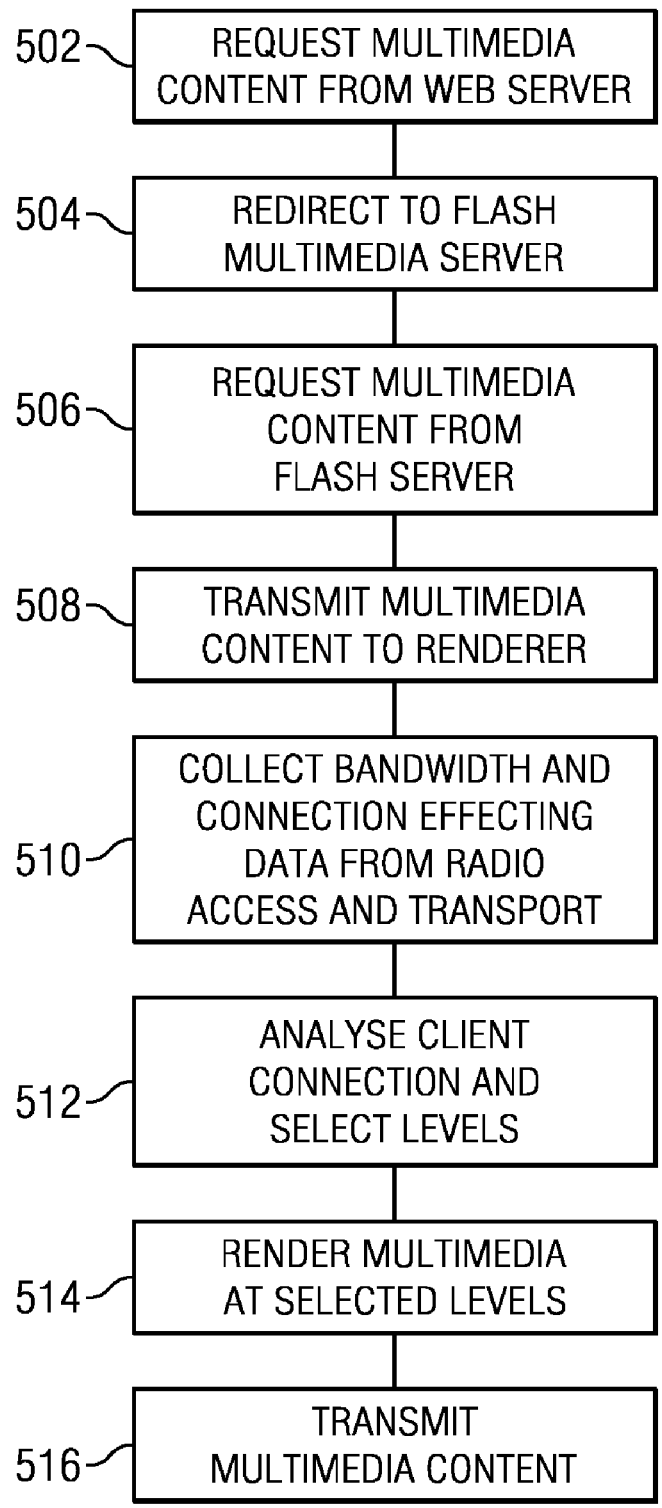
FIG. 5 is a flow diagram describing the operations of the adaptive media-rendering server according to the present disclosure.

Referring now to FIG. 5, there is illustrated a flow diagram illustrating the process for adaptively rendering a multimedia content stream from a flash multimedia network server 112 to a flash plug-in client browser 102. The flash plug-in client browser 102 initially makes a request for some type of multimedia content from a web server 108. Responsive to the request from the client, the multimedia web server 108 redirects the client browser 102 to a flash multimedia server at step 504. Responsive to the redirection message, the client browser 102 requests the multimedia content from the flash server at step 506. Responsive to the request to the flash server 506, the flash multimedia network server transmits at step 508 the multimedia content to the adaptive media-rendering server 302. The adaptive media-rendering server collects bandwidth and connection affecting data from Radio Access and Transport at step 510. This can include information such as the traffic policies 406 and link data 404. All of this information is utilized by the multi-dimensional Euler-Lagrange Minimization process or other type of analysis process or algorithm to determine the most optimum QoS (quality of service) for the client connection as well as Operator's network and select proper encoding and quality of service for the client connection at step 512. The received multimedia from the flash multimedia network server 112 and the determinations from the minimization process 402 are used to render at step 514 the multimedia data stream at the selected levels as determined by the minimization process 402. The newly rendered multimedia stream 410 is transmitted at step 516 from the adapted media-rendering server 302 to the flash plug-in client browser 102.

Thus, the described process is able to insert a proxy server between the source of the multimedia server and a policy enforcement node so that the rendering server 302 can adaptively render a multimedia data stream to specific modulation/coding levels as well as a provided quality of service profile of the user based upon their rate plan. The adaptive rendering process will tap into SASN, PCRF, MBC, CPG, MSP and other system nodes to adaptively adjust and render the multimedia contents to the client. The system and process can drastically reduce the load level on the provider network while providing a good quality of service to the users. The higher degree of control over the connection between the rendering server and the client would also provide capacity efficiencies for the network service provider.

It will be appreciated by those skilled in the art having the benefit of this disclosure that this adaptive multimedia renderer provides an improved system and method for controlling a data connection to a user. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A proxy server for adaptively rendering a multimedia content stream, comprising:
    a first interface for connecting the proxy server to a multimedia network server to receive an original multimedia content stream;
    a second interface for connecting the proxy server to a client for receiving a rendered multimedia content stream;
    processing logic for determining rendering parameters responsive to connection parameters related to connection bandwidth and a transport path between the proxy server and the client, charging policies associated with the client and traffic policies associated with a network providing a connection between the proxy server and the client using a multi-dimensional Euler Lagrange minimization algorithm; and
    rendering logic for rendering the rendered multimedia content stream from the original multimedia content stream responsive to the rendering parameters.

2. The proxy server of claim 1, wherein the processing logic further determines the rendering parameters responsive to traffic policies associated with the connection between the proxy server and the client.

3. The proxy server of claim 1, wherein the processing logic further determines the rendering parameters responsive to charging policies of a user associated with the client.

4. The proxy server of claim 1, wherein the processing logic further determines the rendering parameters responsive to the connection parameters provided from OSS via transceiver stations associated with a wireless network providing the rendered multimedia content stream to the client.

5. The proxy server of claim 1, wherein the processing logic further determines the rendering parameters responsive to user rate plan data of a user associated with the client.

6. The proxy server of claim 1, wherein the processing logic further determines the rendering parameters responsive to quality of service data associated with the connection between the proxy server and the client.

7. A system for providing multimedia content to a client over a wireless communication system, comprising:
    a plurality of transceiver stations for providing a wireless connection to a wireless device including the client;
    a plurality of control nodes for providing connection information relating to the client;
    an adaptive rendering server for generating a rendered multimedia data stream to the client responsive to an original multimedia content stream and the control information from the plurality of control nodes, wherein the adaptive rendering server further comprises:
        a first interface for connecting the server to a multimedia network server to receive the original multimedia content stream;
        a second interface for connecting the adaptive rendering server to the client through one of the plurality of transceiver stations for receiving the rendered multimedia content stream;
        processing logic for determining rendering parameters responsive to connection parameters relating to connection bandwidth between the adaptive rendering server and the client, mobile broadband charging policies of a user associated with the client and traffic policies associated with the connection between the adaptive rendering server and the client using a multi-dimensional minimization algorithm; and
        rendering logic for rendering the rendered multimedia content stream from the original multimedia content stream responsive to the rendering parameters.

8. The system of claim 7, wherein the processing logic further determines the rendering parameters responsive to the connection parameters provided from transceiver stations associated with the wireless system providing the rendered multimedia content stream to the client.

9. The system of claim 7, wherein the processing logic further determines the rendering parameters responsive to user rate plan data of a user associated with the client.

10. The system of claim 7, wherein the processing logic further determines the rendering parameters responsive to quality of service data associated with the connection between the proxy server and the client.

11. A method for adaptively rendering a multimedia content stream, comprising the steps of:
    connecting to a multimedia network server to receive an original multimedia content stream;
    connecting to a client for receiving a rendered multimedia content stream;
    determining multimedia content rendering parameters responsive to real-time connection parameters, charging policies associated with the client and traffic policies associated with a network providing a connection between the proxy server and the client using a multi-dimensional minimization algorithm; and
    rendering the rendered multimedia content stream from the original multimedia content stream responsive to the rendering parameters.

12. The method of claim 11, wherein the step of determining further comprises the step of determining the rendering parameters responsive to the connection parameters provided from transceiver stations associated with a wireless network providing the rendered multimedia content stream to the client.

13. The method of claim 11, wherein the step of determining further comprises the step of determining the rendering parameters responsive to user rate plan data of a user associated with the client.

14. The method of claim 11, wherein the step of determining further comprises the step of determining the rendering parameters using a multi-dimensional Euler-Lagrange minimization process.

15. A proxy server for adaptively rendering a multimedia content stream, comprising:
    a first interface for connecting the proxy server to a multimedia network server to receive an original multimedia content stream;

a second interface for connecting the proxy server to a client for receiving a rendered multimedia content stream;

processing logic for determining multimedia content rendering parameters responsive to real-time connection parameters, charging policies associated with the client and traffic policies associated with a network providing a connection between the proxy server and the client using a multi-dimensional minimization algorithm; and rendering logic for rendering the rendered multimedia content stream from the original multimedia content stream responsive to the rendering parameters.

\* \* \* \* \*